United States Patent [19]

Goertzel et al.

[11] Patent Number: 4,654,721
[45] Date of Patent: Mar. 31, 1987

[54] SYSTEM FOR REPRODUCING MULTI-LEVEL DIGITAL IMAGES ON A BI-LEVEL PRINTER OF FIXED DOT SIZE

[75] Inventors: Gerald Goertzel, White Plains; Gerhard R. Thompson, Wappingers Falls, both of N.Y.

[73] Assignee: International Business Machines Corporation, Armonk, N.Y.

[21] Appl. No.: 722,898

[22] Filed: Apr. 12, 1985

[51] Int. Cl.$^4$ .............................................. H04N 1/40
[52] U.S. Cl. ..................................... 358/283; 358/75; 358/78; 358/80; 358/284
[58] Field of Search ..................... 358/75, 78, 80, 283, 358/284

[56] References Cited

U.S. PATENT DOCUMENTS

| | | | |
|---|---|---|---|
| 4,315,280 | 2/1982 | Tsuda | 358/80 |
| 4,430,668 | 2/1984 | Miles, Jr. | 358/75 |
| 4,463,374 | 7/1984 | Thompson | 358/78 |
| 4,464,677 | 8/1984 | Kuhn et al. | 358/80 |
| 4,485,408 | 11/1984 | Kamizyo et al. | 358/283 |
| 4,495,522 | 1/1985 | Matsunawa et al. | 358/283 |

Primary Examiner—Ronald C. Capossela
Attorney, Agent, or Firm—Thomas P. Dowd

[57] ABSTRACT

A system for producing improved halftone images from continuous tone input images, the pixels of which have been digitized as gray scale values, using a printer having the capability to print a set of output pel patterns producing a respective set of discrete gray scale values, is disclosed. Blocks of pel patterns with discrete gray scale values approximating the gray scale values of the input pixels are selected for printing, and the error in a first block due to the difference between the gray scale value associated with the block and the gray scale value of the corresponding input pixel, is determined. To diffuse this error it is distributed to at least two adjacent blocks using a random number generator to determine the distribution such that a random fraction of said error is distributed to one block and the remainder is distributed to the other block. This error diffusion process is carried through the adjacent blocks taking into account the error fraction already assigned. For edge enhancement the brightness gradient surrounding each input pixel is determined and a threshold value is set below which said gradient is classified as small and above which it is classified as large. When said gradient is small, the selected discrete pattern is printed for the pixel, and when said gradient is large, the pel pattern is altered and the block representing the pixel is printed biasing the pels therein toward the darker input pixels.

5 Claims, 5 Drawing Figures

| gv(l−1,j−1) | gv(l−1,j) | gv(l−1,j+1) |
| --- | --- | --- |
| gv(l,j−1) | gv(l,j) | gv(l,j+1) |
| gv(l+1,j−1) | gv(l+1,j) | gv(l+1,j+1) |

FIG. 4. Input Pixels Examined for Edge Enhancement.

| | Pattern | | Reflectivity | Gray Value |
|---|---|---|---|---|
| | BLOCK | AREA | | |
| 0 | | | 72.8 | 0 |
| 1 | | | 59.4 | 56 |
| 2 | | | 51.7 | 88 |
| 3 | | | 44.0 | 120 |
| 4 | | | 39.1 | 141 |
| 5 | | | 34.1 | 162 |
| 6 | | | 28.8 | 184 |
| 7 | | | 24.9 | 200 |
| 8 | | | 22.5 | 210 |
| 9 | | | 22.1 | 212 |
| 10 | | | 19.9 | 221 |
| 11 | | | 17.4 | 232 |
| 12 | | | 16.5 | 235 |
| 13 | | | 14.6 | 243 |
| 14 | | | 14.3 | 245 |
| 15 | | | 13.1 | 250 |
| 16 | | | 11.8 | 255 |

Figure 2. Halftone Dot Patterns

| (l−1,i−2) | (l−1,i−1) | (l−1,i) | (l−1,i+1) | (l−1,i+2) |
|---|---|---|---|---|
| (l,i−2) | (l,i−1) | *a* <br> (l,i) | (l,i+1) | (l,i+2) |
| (l+1,i−2) | (l+1,i−1) | (l+1,i) | (l+1,i+1) | (l+1,i+2) |
| (l+2,i−2) | (l+2,i−1) | (l+2,i) | (l+2,i+1) | (l+2,i+2) |

FIG 3. Blocks on the Output Image.

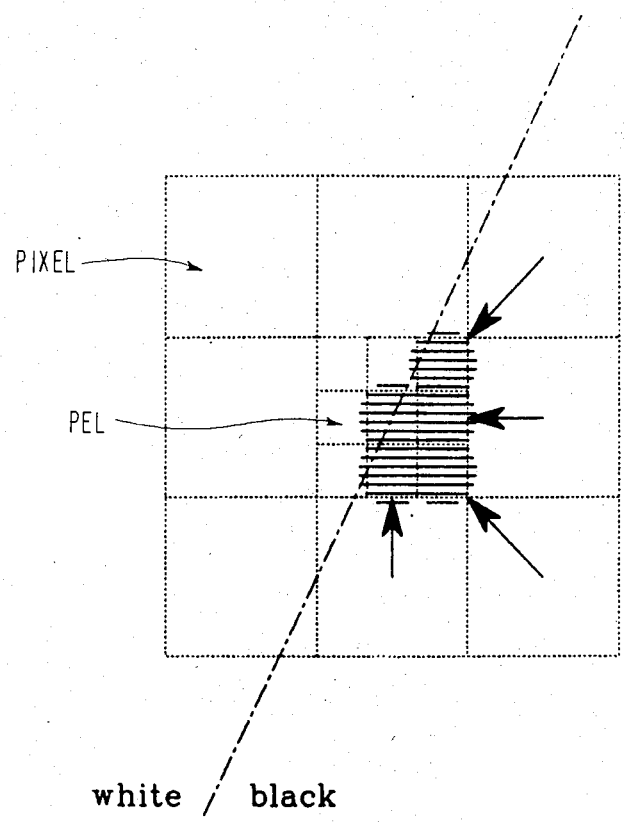
NOTE: CENTER OUTPUT PEL CORRESPONDS TO CENTER INPUT PIXEL
Figure 5. Biasing of 3 x 3 Output Pattern.

SYSTEM FOR REPRODUCING MULTI-LEVEL DIGITAL IMAGES ON A BI-LEVEL PRINTER OF FIXED DOT SIZE

BACKGROUND OF THE INVENTION

The present invention is concerned with digital halftone generation techniques for the printing of digitized continuous tone images on printers which have fixed print positions and a limited range of discrete print intensities, the most common case being bi-level printers. In particular, the invention is directed to the utilization of error propagation to compensate for the absence of continuous printing of gray values, and an improved technique for edge enhancement.

In the conventional printing process, continuous tone images are prepared for printing by exposure through a halftone screen. The resultant image will have dots of various sizes, one for each opening in the screen. These dots are larger where more light penetrates the screen and smaller where less light is present. Thus the exposure through the screen converts the gray value of the original image at the opening in the screen into a dot of appropriate diameter.

In the digital analog of the above process, the original image is scanned with a scanner and the data are captured in a digital computer. These data consist of binary representations of the scanned gray values; each such value (typically ranging from 0 to 255) corresponds to one scanned area or pixel of the input image. To reproduce this image on a printer capable of only printing black dots or pels in fixed output positions, it is necessary to create a sensation of gray by suitable choice of the pels to be printed. A summary of various techniques that have been used in the past is contained in the IBM Journal of Research and Development, Vol. 26, No. 6, pps. 687-697.

The scanned image may be scaled in the computer, but in any event, it may be assumed, without loss of generality, that there is one pixel of the input image for each dot to be represented in the output. The dots are represented in the output of a digital printer as patterns of pels, and the pel patterns may be considered to be arranged in blocks. Each pel in a block is either printed or not by the digital printer. Each such block represents the digital analog of the halftone dot used in conventional printing. Such a block may be of any shape which contains an integral number of pel positions and which, when replicated, fills the area to be printed without overlap. Square or rectangular block shapes are convenient. An extreme case is that where the block contains only one pel. Different levels of gray are obtained by printing or reproducing different pel patterns within a block. If the block contains only one pel, only two values of gray are available. Additional pels within a block will permit the printing of additional discrete gray values. Larger blocks will give more discrete gray values or levels, but also tend to reduce the resolution of the output image.

An error occurs in the gray values of the output image when the gray levels available for printing within a block differ from the gray level determined for the respective block, which level is based on the brightness of the corresponding analogous halftone dot. Hence, the limited number of gray values available from the blocks limits the quality of the printed image due to the absence of correct grays in some areas and also to the creation of contours as the reproduction process goes from one block pattern to another in a region of slowly varying gray value.

These problems may be alleviated by intermixing the levels in different blocks in such a manner as to obtain the desired gray value as an average over many neighboring blocks. A technique of "error propagation" used to achieve such an intermixing is described, for example, in co-pending U.S. application U.S. Pat. No. 4,569,081, assigned to the same assignee as the present invention. In error techniques of this type the gray value desired at a given block position in an output image is determined from the input gray level at that position added to the error propagated from previous positions. More particularly, to begin with, an output pel pattern for a given block is selected from among the available patterns, which pattern typically represents an approximation to the gray value desired for that block. The error is determined as the difference between the desired gray and the gray now associated with the given block. The determined error is then distributed or assigned to one or more adjacent block positions on the same or subsequent lines of the image. This selection and error distribution method is then continued throughout the lines of the image taking into account the assigned error when selecting the appropriate pel pattern for each block.

A variety of methods have been previously used for allocating the distribution of the error. However, all divide the error into fixed proportions and thus have suffered to a greater or lesser extent from the problem of producing "worms", that is, output pattern artifacts consisting of apparent curved or straight lines.

In addition to the "worms", these methods tend to give fuzzy edges between dark and light regions of the image.

The present invention concerns itself with the elimination of the "worms" and with the sharpening of the fuzzy edges.

SUMMARY OF THE INVENTION

It is accordingly an object of the present invention to provide a system for achieving improved error propagation and also for accomplishing edge enhancement.

In the prior art, as noted above, error diffusion is usually carried out by propagating the error at a particular block in fixed proportions to two or more adjacent block positions. For example, the propagation of an error "e" to each of two blocks "a" and "b" might be accomplished using a relationship such as $$ea = 0.5\ e$$

$$eb = 0.5\ e$$

to calculate the error proportions propagated to blocks a and b. By comparison, in accordance with the present invention the error proportion is varied at random, with the aid of a source of pseudo random numbers. More particularly, in one implementation of the present invention the relationship to be used becomes, with "r" denoting a pseudo-random number equidistributed on the range 0 to 1, $$ea = r\ e$$

$$eb = e - ea$$

wherein the sum of the propagated errors ea,eb equals the total error e. This implementation has been found to eliminate the "worms" noted in images reproduced with prior art processes. However, in some portions of some images a "pebbly" appearance may occur, in which event a more pleasing result may be obtained using the relationship $$ea = (0.25 + 0.5\ r)e$$

$$eb = e - ea.$$

Other random distributions of the error to be propagated may also be used as will be found appropriate.

In addition to, and in keeping with, the foregoing technique the present invention comprehends a method for enhancing the sharpness of the edges of objects occurring within the image. The edge enhancement technique of the present invention uses output blocks of pels and the associated brightness gradients, determined from the input image. For example, the system may be constructed to operate when the output blocks are 3×3 pels or 3×6 pels. In the latter case, edge enhancement is carried out for each 3×3 half block independently. More particularly, the brightness gradient for each 3×3 pel region is firstly determined. A threshold value is chosen below which the brightness gradient is classified as small and above which it is classified as large. When the gradient is small, the edge enhancement method is not used. When the gradient is large, the selection of the pel pattern approximating the gray value previously determined for the block or half block containing the region is discarded. Rather the appropriate number of the nine pels in the region to be printed is determined from the input gray value. Associated with and corresponding to the output pels in this 3×3 region are the input gray value for the region and the input gray values for the eight blocks surrounding the region. The largest gray value among these nine input gray values is found. The output pel in the 3×3 region corresponding in position to that of the block with this largest gray value, is then selected for printing. The block with the next largest gray value is found and the pel in the 3×3 region corresponding in position is then printed. This process is continued until the appropriate number of the nine pels, as previously determined, are selected for printing. As a result, the black or printed pels in the 3×3 region will be placed toward the neighboring regions with the darkest input values, thus yielding sharp edges.

BRIEF DESCRIPTION OF THE DRAWINGS

FIG. 2 illustrates block patterns used in printing, as prepared for a particular printer, in keeping with the present invention. The first column under the heading PATTERN shows individual blocks of 3×6 pels containing 17 different pel patterns, and the the second column shows corresponding areas containing nine identical blocks as they are arranged in printing. The REFLECTIVITY column shows measured values of reflectivity (%) for a large area filled with replicas of the corresponding block. The GRAY VALUE column is derived from the reflectivities by a linear transformation and contains the gray values associated with the respective blocks.

FIG. 3 illustrates the various blocks and half blocks of an output image. The direction of propagation of error is indicated, for one block, by diagonal arrows.

FIG. 4 shows the relation of input pixels to output pels for edge enhancement.

FIG. 5 shows the placement of the output pels within a block to achieve edge enhancement.

DESCRIPTION OF THE PREFERRED EMBODIMENT

Figure 1:
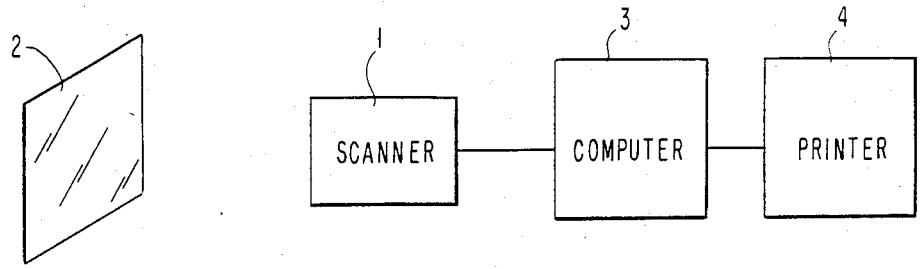
FIG. 1 is a block diagram of a basic system for carrying out the present invention.

A basic system for carrying out the present invention is shown in FIG. 1 and generally is composed of a means 1, e.g., an image scanner, for digitizing an original continuous tone image, such as a photograph 2, and providing it to a general purpose computer 3 wherein it is processed for printout as a halftone image on a digital printer 4.

An input image of the type to be acted upon by the present invention may be represented by a series of gray values arranged in an array of L lines, each line containing I gray values. The gray values are typically expressed as integers in the range from 0 to 255. The output image is considered to consist of blocks of pels, each pel corresponding to an output dot or element that is printed by a digital printer or that otherwise makes up a tangible representation of the image. As seen in FIGS. 2 and 3, the blocks to be described are composed of 3×6 pels for each pair of input gray values, so that there will by 9 times as many output pels as there are input gray values. Referring to FIG. 2, 17 available block patterns are shown along their associated reflectivities and gray values for a particular printer. The output image will consist of lines of suitably chosen blocks from among the 17 to approximate the desired gray values in the various image areas. It will be seen that in alternate lines of the image, the output blocks are shifted by three pels when printed, corresponding to the conventional 45 degree halftone grid used in analog printing.

Referring next to FIG. 3, the steps of the method or algorithm for carrying out error diffusion in accordance with the present invention will be described. The positions on the input image are represented by a pair of numbers (1,i) where 1 is the line number and i is the number of the gray value in that line. The gray value for "a", the (1,i) pixel, in the input image is denoted gv(1,i). The gray value associated with a pattern number b will be designated g(b). A temporary array is used to store the errors, e(1,i).

The steps of the algorithm are as follows:
Initialize the errors for the first line: e.g., for i=1, 3, ..., I−1 e(1,i)=0

Repeat the following sequence for all lines in the image. For odd lines, the calculation is carried out for i=1, 3, ..., I; for even lines for i=2, 4, ..., I. Initialize the error at the extreme left of the next line:
for an odd line e(l+1,0)=0
for an even line e(l+1,1)=0
Calculate the desired gray value d as the average of the gray values corresponding to the block:

$$d + (gv(l,i) + gv(l,i+1))/2$$

Find the trial block number b such that d is equal to or greater than the gray value of block b and less than the gray value of block b+1. Select b such that $$g(b) = < d < g(b+1)$$

If $d + e(l,i) = > g(b+1)$ increase b by 1. If b > 16, set b to 16.

Place block b in the appropriate location on the output image, ready for printing.

Calculate and propagate the error x. First calculate the error:

$$x = e(l,i) + d - g(b).$$

Distribute the error in accordance with the arrows in FIG. 3.

$$e(l+1, i+1) = (0.25 + 0.5\ r)x$$

$$e(l+1, i-1) = e(l+1, i-1) + x - e(l+1, i+1)$$

where r is a pseudo-random number equidistributed on the range 0 to 1.

Following distribution of the errors throughout the image in this manner, the output image will print out without worming or pebbling.

To perform edge enhancement for each half of the output block, if required, the following steps may be carried out ( see FIG. 4 );

For the left half, $j = i$; for the right half $j = i + 1$.

A quantity proportional to the square of the magnitude of the intensity gradient is given by $$(gv(l+1, j+1) - gv(l-1, j-1))^{}2 + (gv(l+1, j-1) - (gv(l-1, j+1))^{}2$$

If this quantity is greater than some threshold (e. g. 10,000), the corresponding half of the output block is modified to produce edge enhancement.

The number of black output pels n for the modified 3×3 half block is calculated as, e. g., $$n = 9\ gv(l,j)/256$$

where n is rounded to the nearest integer.

Then, referring to FIG. 4, the n largest gray values from the set of FIG. 4 are found and the corresponding output pels in the 3×3 half block are made black or printed on the output image as shown in FIG. 5.

Upon the application of both correction techniques described above an halftone output image may be obtained from a continuous tone input image with clearly defined edges on the objects therein and without artifacts such as worming or pebbling in the other areas.

The system herein described will produce printed images the same size as the scanned images on printers having three times the linear resolution of the scanner. For example, a scanned image of 200 pels/which may be printed out on a 600 pels/inch printer. A preferred printer for implementing the invention is the IBM 4250 which has been found to produce excellent electroerosion reproductions suitable for use in the preparation of long life lithographic plates. Various image scanners and other conventional means may be used in the process of capturing the images in a general purpose computer such as an IBM System 370 and the described algorithms may be run by the computer. When it is necessary to change the output image size, the input image may be modified in size by any of a variety of algorithms suitable for handling digital multi-level images that are known in the art.

Having thus described our invention, what we claim as new and desire to secure as letters patent is:

1. A method for producing a halftone image from a continuous tone input image, the pixels of which have been digitized as gray scale values, using a printer having the capability to print a set of output pel patterns producing a respective set of discrete gray scale values, comprising the steps of:

selecting for printing blocks of pel patterns with gray scale values approximating the gray scale values of the input pixels;

determining the error in a first block due to the difference between the gray scale value associated with the block and the gray scale value of the corresponding input pixel;

distributing said error in said first block to at least two adjacent blocks;

determining the error in one of said adjacent blocks due to the difference between the gray scale value associated with the block and a gray scale value calculated as the sum of the error previously distributed to that block and the gray scale value of the corresponding input pixel; and distributing said error in said one adjacent block to at least two blocks adjacent to it not including said first block; wherein the improvement comprises:

using a random number generator to determine the distribution of the error between said adjacent blocks such that a random fraction of said error is distributed to one block and the remainder is distributed to the other block.

2. A method for producing a halftone image from a continuous tone input image, the pixels of which have been digitized as gray scale values, using a printer having the capability to print a set of output pel patterns producing a respective set of discrete gray scale values, comprising the steps of:

selecting for printing blocks of pel patterns with gray scale values approximating the gray scale values of the input pixels;

determining the brightness gradient surrounding each input pixel;

setting a threshold value below which said gradient is classified as small and above which it is classified as large;

when said gradient is small, printing the selected discrete block pattern for said pixel; and when said gradient is large, altering the pel pattern and printing the block representing said pixel biasing the pels therein toward the darker input pixels.

3. A method for producing a halftone image from a continuous tone input image, the pixels of which have been digitized as gray scale values, using a printer having the capability to print a set of output pel patterns producing a respective set of discrete gray scale values, comprising the steps of:

selecting for printing blocks of pel patterns with gray scale values approximating the gray scale values of the input pixels, said blocks comprising n×n pels:

determining the error in each block due to the difference between the gray scale value associated with the block and the gray scale value of the corresponding input pixel;

distributing said error in each block to at least two adjacent blocks;

using a random number generator to determine the distribution of the error between said adjacent blocks such that a random fraction of said error is distributed to one block and the remainder is distributed to the other block;

determining the brightness gradient surrounding each input pixel;

setting a threshold value below which said gradient is classified as small and above which it is classified as large;

when said gradient is small, printing the n×n block for said pixel; and when said gradient is large, altering the pel pattern and printing the n×n block representing said pixel biasing the pels therein toward the darker input pixels.

4. A system for producing a halftone image from a continuous tone input image, the pixels of which have been digitized as gray scale values, using a printer having the capability to print a set of output pel patterns producing a respective set of discrete gray scale values, comprising:

means for selecting for printing blocks of pel patterns with gray scale values approximating the gray scale values of the input pixels;

means for determining the error in a first block due to the difference between the gray scale value associated with said first block and the gray scale value of the corresponding input pixel;

means for distributing said error in said first block to at least two adjacent blocks;

means for determining the error in one of said adjacent blocks due to the difference between the gray scale value associated with said one adjacent block and a gray scale value calculated as the sum of the error previously distributed to said one adjacent block and the gray scale value of the corresponding pixel;

means for distributing said error in said one adjacent block to at least two blocks adjacent to said one adjacent block not including said first block; and random number generator means for determining the distribution of the error between said at least two blocks adjacent to said one adjacent block such that a random fraction of said error is distributed to one block of said at least two blocks adjacent said one adjacent block and the remainder is distributed to the other block of said at least two blocks adjacent said one adjacent block.

5. A system for producing a halftone image from a continuous tone input image, the pixels of which have been digitized as gray scale values, using a printer having the capability to print a set of output pel patterns producing a respective set of discrete gray scale values, comprising the steps of:

means for selecting for printing blocks of pel patterns with gray scale values approximating the gray scale values of the input pixels;

means for determining the brightness gradient surrounding each input pixel;

means for setting a threshold value below which said gradient is classified as small and above which it is classified as large;

means for printing the selected discrete block pattern for said pixel, when said gradient is small; and means for altering the pel pattern and printing the block representing said pixel biasing the pels therein toward the darker input pixels, when said gradient is large.

* * * * *